(12) United States Patent
Shibata (10) Patent No.: US 6,208,448 B1
(45) Date of Patent: Mar. 27, 2001

(54) SCANNING OPTICAL APPARATUS

(75) Inventor: Etsuko Shibata, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/223,804

(22) Filed: Dec. 31, 1998

(30) Foreign Application Priority Data

Jan. 5, 1998 (JP) .................................................. 10-000061

(51) Int. Cl.$^7$ .................................................. G02B 26/08
(52) U.S. Cl. ....................... 359/196; 359/206; 359/216; 359/819
(58) Field of Search .................... 359/196–226, 359/811, 819, 820

(56) References Cited

U.S. PATENT DOCUMENTS

| | | | |
|---|---|---|---|
| 4,634,232 | * | 1/1987 | Tateoka .................................. 350/394 |
| 5,864,739 | * | 1/1999 | Kaneko .................................. 399/220 |
| 5,870,133 | * | 2/1999 | Naiki .................................... 347/247 |

FOREIGN PATENT DOCUMENTS 4-320079 * 11/1992 (JP) .

* cited by examiner

Primary Examiner—Cassandra Spyrou
Assistant Examiner—Leo Boutsikaris
(74) Attorney, Agent, or Firm—Burns, Doane, Swecker & Mathis, LLP (57) ABSTRACT

A scanning optical apparatus constitutes a light source which emits a ray in a wavelength range of 460 to 650 nm, a first lens unit for forming a luminous flux using the ray and having at least one or more positive lens element, a scanner for scanning the luminous flux, a second lens unit for forming an image on a scanned medium using the luminous flux and a holding structure connected the light source to the first lens unit via at least two support members having mutually different linear expansion coefficients. In scanning optical apparatus, the movement of the image forming point on the scanned medium caused by change in the oscillation wavelength of the light source is compensated by the thermal expansion of the support members.

8 Claims, 3 Drawing Sheets

SCANNING OPTICAL APPARATUS

RELATED CROSS-REFERENCED APPLICATIONS

This application is based on Application No. 10-61 filed in Japan, the content of which is hereby incorporated by reference.

FIELD OF THE INVENTION

The present invention relates to temperature compensation of a scanning optical apparatus using a visible light laser as a light source.

BACKGROUND OF THE INVENTION

Figure 5:
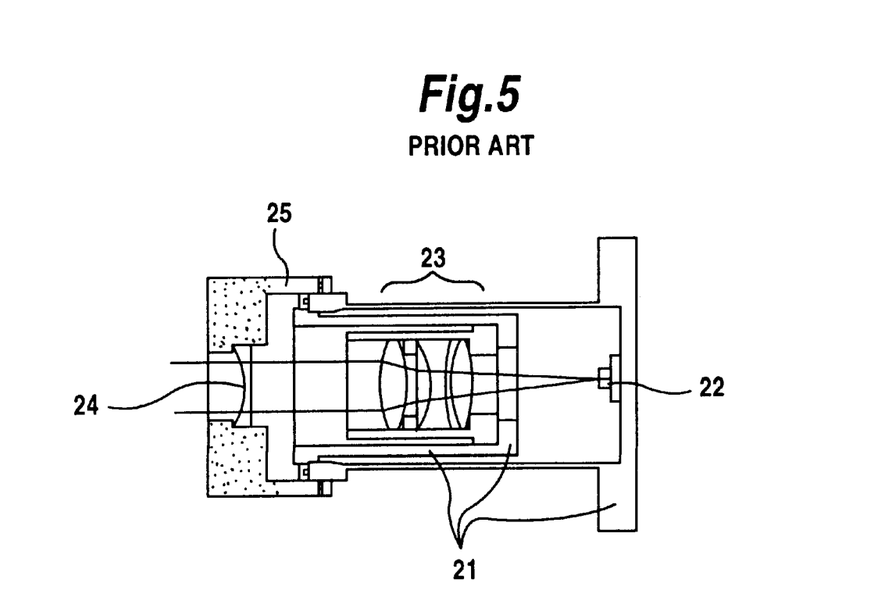
FIG. 5 is a vertical section view of the light source of the prior art.

In the field of temperature compensation for the light source unit of scanning optical systems, art has been proposed for compensating for the spatial variation between a laser light source 22 and a condensing lens 23 caused by temperature fluctuation by combining a plurality of condensing lens element holding member 21, as shown in FIG. 5, pursuant, for example, to the disclosure of Japanese Laid-Open Patent No.4-107518. Reference number 24 in the same drawing refers to a concave lens, and reference number 25 refers to a lens holder.

Japanese Laid-Open Patent Application No. 61-162014 discloses art for compensating temperature fluctuation caused by the oscillation wavelength of a semiconductor laser by changing the length of the light source support member. Furthermore, when the condensing lens is constructed as a single element lens, the focal length of the light source changes due to change in the oscillation wavelength of the laser induced by a change in temperature, and a method for compensating for the shift of the image forming point on the scanned medium caused by this variation is proposed in Japanese Laid-Open Patent Application No. 61-162014, which discloses a method for selecting the linear expansion coefficient of the support members so that the amount of change in the space between the condensing lens and the light emission point induced by thermal deformation of the light source support member is equal to the amount of change in the focal length.

In the construction disclosed in Japanese Laid-Open Patent No. 4-107518, however, the temperature compensation is applied to the space between the laser light source and the condensing lens, and the focal length of the condensing lens is not changed. In practice, the focal length is changed by a change in the refraction index caused by wavelength and temperature, and although it is possible to suppress this change in focal length by using a plurality of materials for the condensing lens elements, such a solution is disadvantageous from the perspective of increased cost of components and assembly due to the increased number of lens elements.

In the construction disclosed in Japanese Laid-Open Patent Application No. 61-162014, thermal expansion and change of the refractive index of the collimator lens due to temperature, and the influence of temperature on the fθ lens are not considered. Since the change in focal length is particularly great in the case of visible light, the support member must have a large linear expansion coefficient, which narrows the breadth of material selection, and the method only allows for changing the composition ratio of glass fibers in resin. When the support member comprises a member having a single type of linear expansion coefficient, the aforesaid composition ratio must be finely adjusted, thereby making it disadvantageously difficult to obtain resin materials inexpensively.

When the beam diameter is reduced by reducing the oscillation wavelength of the laser light and a single element collimator lens is used to reduce cost, the e reflective index of the material changed greatly due to the change in wavelength caused by the reduction of the oscillation wavelength, so as to disadvantageously be unbeneficial relative to temperature change.

SUMMARY OF THE INVENTION

An object of the present invention is to provide an improved scanning optical apparatus.

Another object of the present invention is to provide a condensing lens of single element construction or a plurality of lens elements which do not include a negative lens element even in the visible light range in which there is large variation in refractive index depending on the wavelength.

A further object of the present invention is to provide a scanning optical apparatus having a light source capable of compensating for the shift of the image forming point on a scanned medium caused by temperature change.

An even further object of the present invention is to provide a scanning optical apparatus which provides temperature compensation for the entire optical system including temperature change of the fθ lens via a simple construction without using an expensive autofocus mechanism to detect and feedback the mage forming position in a scanning optical system of a scanning optical apparatus.

These objects are attained by providing a scanning optical apparatus having:

- a light source which emits a ray in a wavelength range of 460 to 650 nm;
- a first lens unit for forming a luminous flux using the ray and having at least one or more positive lens element;
- a scanner for scanning the luminous flux;
- a second lens unit for forming an image on a scanned medium using the luminous flux; and
- a holding structure connecting the light source to the first lens unit via at least two support members having mutually different linear expansion coefficients,
- wherein the movement of the image forming point on the scanned medium caused by change in the oscillation wavelength of the light source is compensated by the thermal expansion of the support members.

The invention itself, together with further objects and attendant advantages, will be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

Figure 1:
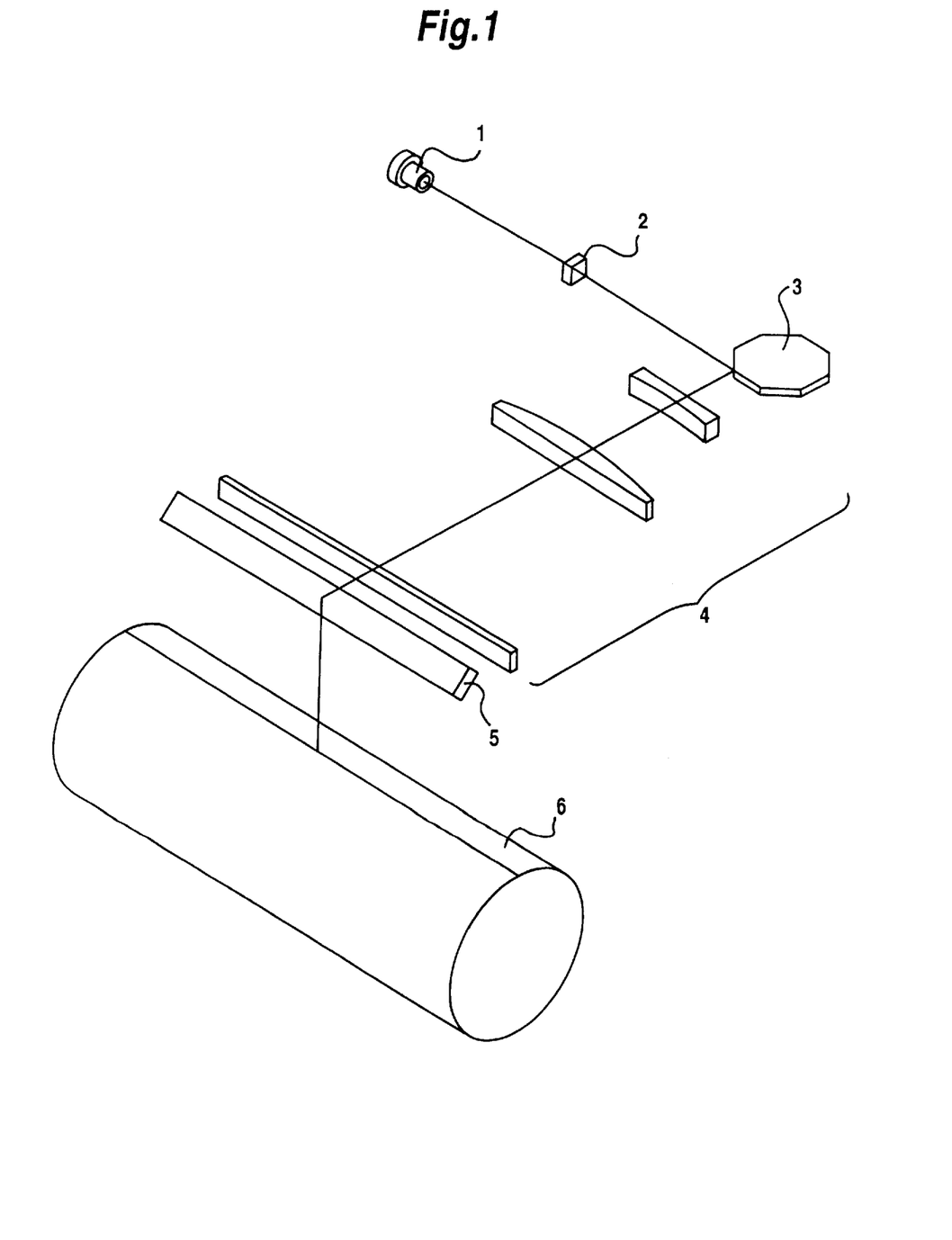
FIG. 1 is a perspective view showing the basic construction of the scanning optical apparatus of the present invention.

FIG. 1 is a perspective view showing the basic construction of the scanning optical apparatus of the present invention. As shown in the drawing, the laser light emitted from a light source unit 1 is transmitted through a cylindrical lens 2 forming a linear cross section, which is deflected by a deflecting device 3 comprising a rotating polygonal mirror. Then, the light is transmitted through a second lens unit 4 comprising an fθ lens system, and is reflected by a mirror 5 so as to impinge a scanning surface 6. In the following description, the light source unit 1 includes a light source for emitting laser light, light source support member, and a first lens comprising a collimating lens system.

First Embodiment

Figure 2:
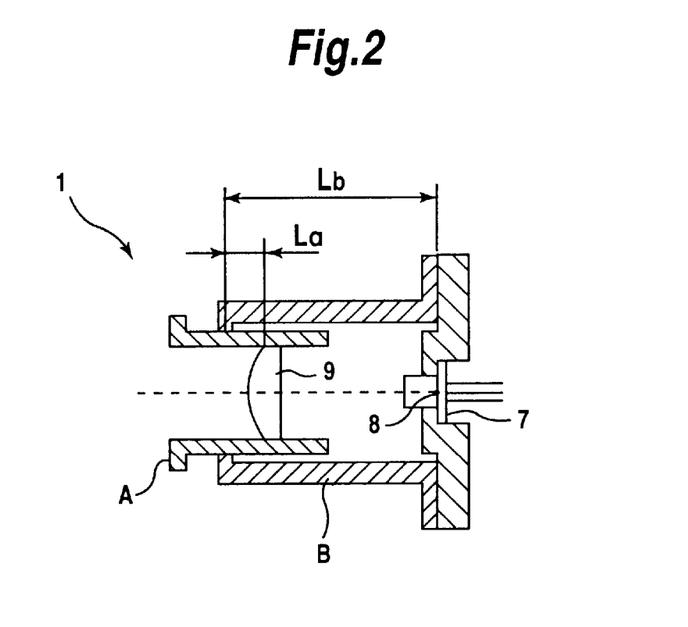
FIG. 2 is a vertical section view of the light source relating to examples 1 and 4 of the first and second embodiments of the invention.

FIG. 2 is a vertical section view of the light source unit 1 of the first embodiment of the invention. As shown in the drawing, the light source 7 which emits laser light is linked to the first lens element 9 on the optical axis through support members A and B. The dimension line La in the drawing represents the distance on the optical axis from the fixed position of the support members A and B to the first lens element 9, and the dimension line Lb represents the distance on the optical axis from the light emission point 8 of the light source 7 to the fixed position of the support members A and B.

The table below shows the specifications of each structural element at normal temperature (t=20° C.) in the structure in the main scan direction (plane parallel to the deflection surface). The cylindrical lens is omitted since there is no refracting power within the surface. The deflection surface is also omitted.

TABLE 1

| Laser (light source) data | |
|---|---|
| Oscillation wavelength (nm) | 635 |
| Oscillation wavelength temperature dependence coefficient (nm · deg$^{-1}$) | 0.23 |

TABLE 2

| Optical system ($\lambda$ = 635 nm) | | |
|---|---|---|
| | Collimator lens | fθ lens |
| Focal length (mm) | 15 | 300 |
| Material | SF57 (optical glass) | Zeonex (optical resin) |
| Refractivity | 1.69564 | 1.52305 |
| Linear expansion coefficient ($\lambda$L) (mm · deg$^{-1}$) | 7.9*10$^{-6}$ | 6.9*10$^{-5}$ |
| Refractivity temperature dependence coefficient (deg$^{-1}$) | 9.5*10$^{-6}$ | −8.4*10$^{-5}$ |
| Lens dispersion rate ($v^{-1}$) (nm$^{-1}$) | 12.81*10$^{-5}$ | 7.48*10$^{-5}$ |

TABLE 3

| Light source unit support members | | |
|---|---|---|
| | Support Member A | Support Member B |
| Material | Fe (metal) | PC-GF30 (resin) |
| Linear expansion coefficient ($\alpha$1, $\alpha$2) (deg$^{-1}$) | 1.17*10$^{-5}$ | 3.2*10$^{-5}$ |

This construction is described below in terms of temperature change $\Delta t$ of 20 degrees. The oscillation wavelength of the laser during temperature rise ($\Delta t$=+20 degrees, t=40° C.) is expressed below.

$$\lambda' = \lambda + \Delta\lambda \cdot \Delta t \quad (1)$$
$$= 635 + 0.23 * 20$$
$$= 639.6 \text{ nm}$$

The refractivity of the collimating lens of the optical system is expressed below, $$nco' = nco + \{-(nc0-1)vco^{-1} \cdot \Delta\lambda + dco\} \cdot \Delta t \quad (2)$$
$$= 1.69564 + (-8.9 \times 10^{-5} \times 0.23 + 9.5 \times 10^{-6}) \times 20$$
$$= 1.69542$$

and the focal length of the collimating lens is expressed below.

$$f1co' = \{(nco-1)/(nco'-1) + \Delta Lco \cdot \Delta t\} f1co \quad (3)$$
$$= (0.69564/0.69542 + 7.9 \times 10 - 6 \times 20) \times 15$$
$$= 15.00712$$

The amount of shift in the laser emission point (L1) to compensate for the image plane shift due to focal length fluctuation of the collimator lens is expressed below.

$$L1 = f1co' - f1co \quad (4)$$
$$= 7.12 \times 10^{-3} (\text{mm})$$

The refractivity of the fθ lens is $$nf' = nf + \{-(nf-1)vf - 1 \cdot \Delta\lambda + df\} \cdot \Delta t \quad (5)$$
$$= 1.52305 + (-3.9 \times 10^{-5} \times 0.23 - 8.4 \times 10^{-5}) \times 20$$
$$= 1.52119$$

and the focal length of the fθ lens is expressed below.

$$f1f' = \{(nf-1)/(nf'-1) + \Delta Lf \cdot \Delta t\} f1f \quad (6)$$
$$= (0.52305/0.52119 + 6.9 \times 10^{-5} \times 20) \times 300$$
$$= 301.4846$$

The amount of shift in the laser emission point (L2) to compensate for the shift of the image plane due to the fluctuation of the focal length of the fθ lens is expressed below.

$$L2 = (1/flf - 1/flf')flco^2 \quad (7)$$
$$= (1/300 - 1/301.4846) \times 225$$
$$= 3.69 \times 10^{-3} \text{(mm)}$$

According to equations (4) and (7), the following obtains.

$$L1+L2=1.08\times10^{-2}\text{(mm)} \quad (8)$$

When the length La of the support member A is such that the length Lb of the support member B is Lb=La+flco, the amount of change (L3) between the laser emission point of the light source unit support members and the collimator lens is expressed below.

$$L3=\{(flco+La)\cdot\alpha2-La\cdot\alpha1\}\cdot\Delta t \quad (9)$$

$$La=(L3-flco\cdot\alpha2\cdot\Delta t)/(\alpha2-\alpha1)/\Delta t \quad (10)$$

and when $$L3=L1+L2 \quad (11)$$

and solving for La, the following obtains.

$$La = (10.81 \times 10^{-3} - 15 \times 3.2 \times 10^{-5} \times 20)/$$
$$\{3.2 \times 10^{-5} - 1.17 \times 10^{-5}) \times 20\}$$
$$= 3.0 \text{(mm)}$$

Where the following definitions obtain.

$\Delta\lambda$: Oscillation wavelength temperature dependence coefficient nco: Refractivity of the first lens (design value)

nco': Refractivity of the first lens (during temperature change)

nf: Refractivity of the second lens (design value)

nf: Refractivity of the second lens (during temperature change)

flco: Focal length of the first lens (design value)

flco': Focal length of the first lens (during temperature change)

flf: Focal length of the second lens (design value)

flf: Focal length of the second lens (during temperature change)

$vco^{-1}$: Dispersion rate of the first lens $vf^{-1}$: dispersion rate of the second lens dco: Refractivity temperature dependence coefficient of the first lens df: Refractivity temperature dependence coefficient of the second lens $\Delta$Lco: Linear expansion coefficient of the first lens $\Delta$Lf: Linear expansion coefficient of the second lens La: Distance on the optical axis from the fixed position of the support member A and support member B to the first lens Lb: Distance on the optical axis from the light emission point of the light source to the fixed position of the support member A and the support member B.

First, the change in the refractivity of the lens caused by temperature change is described below; the influence of the change in refractivity caused by the change in the oscillation wavelength of the laser expressed in equation (1) cannot be ignored in the case of a lens which does not remove color as in the present embodiment. Particularly in the visible light range, there is a large change in refractivity due to wavelength fluctuation, and depending on the material the value becomes nearly double the value approaching $\lambda$=780 nm used conventionally. Accordingly, both the change in refractivity due to temperature fluctuation and the change in refractivity due to a change in wavelength must be considered, as in equations (2) and (5).

Next, the focal length is described; after the temperature change the focal length becomes as indicated in equations (3) and (6) due to the influence of thermal deformation of the lens in addition to the change in refractivity. Consequently, the image forming point on the scanned medium is shifted to the positive side if the focal length and laser emission point do not change together with the collimator lens and f$\theta$ lens. The amount of change in the spacing between the lens and the laser emission point required to compensate for the shift in the image forming point is calculated by equations (4) and (7), respectively, and the amount of change equaling the sum of the two values shown in equation (8) is produced by the thermal deformation of the light source support members.

By equation (4), the amount of shift of the laser emission point becomes equal to the amount of change in the focal length (of the collimator lens). This relationship is strictly produced when the construction is such that the light flux from the laser emission point is rendered to completely parallel light via the collimator lens, but this relationship is satisfied even in the case of nearly parallel convergent light achieved as far as possible via the construction of the light source unit of the scanning optical apparatus. Although equation (7) expresses a case similar to the parallel light of equation (4), this relationship can be ignored due to the lack of influence on the state of the light flux from the collimator lens.

Equation (9) expresses the amount of change (L3) between the laser emission point and the lens caused by thermal deformation of the support members. Equation (10) solves for the distance La on the optical axis from the fixed position of the support member A and support member B to the first lens, of equation (9); The distances La and Lb can be calculated to provide the temperature compensation system by setting the value L3 to L3=L1+L2 as shown in equation (11). In the present embodiment, La=3 mm, and Lb=18 mm. Since error sensitivity is extremely high between the laser emission point and the lens, it is necessary to adjust the spacing by sliding the support member A relative to support member B during assembly adjustment, but the amount of this adjustment is in the order of microns, and is not of a level that affects the temperature compensation system.

The relationship L1+L2−L3~0 must be satisfied to produce the temperature compensation system. Considering some of the influences on focal depth on the scanning surface when the amount of shift of the laser emission point equals the amount of change in the focal length (of the collimator lens), the aforesaid relational equation is substituted by the following.

$$|L1+L2-L3|<0.002\text{(mm)}$$

This relational equation can be generalized as shown below by specifying the temperature change $\Delta t$=20 degrees in the present embodiment.

$$|L1+L2-L3|<0.0001\cdot\Delta t \quad (12)$$

The light source of the present embodiment is substantially similar to the conventional example with the exception of the oscillation wavelength and the linear expansion coefficient. That is, La<Lb. In the case of the conventional example shown in Japanese Laid-Open Patent Application No. 4-107518, material having a smaller linear expansion coefficient is used as the material of the longer support member, and material having a larger linear expansion coefficient is used as the material for the shorter support member so as to avoid a temperature change from affecting the spacing between the light source and the collimator lens. That is, La<Lb, and α1>α2.

To produce state similar to that of the conventional example, the change in wavelength must be small, or it must be difficult to influence the wavelength change, and the change in refractivity must be small. Specifically, the following conditions must obtain:

1. λ=780 nm (change in refractivity is small relative to the change in wavelength;
2. the collimator lens must eliminate color (a multiple element construction including a negative lens); and
3. the fθ lens must be a glass lens.

On the other hand, the construction of the present embodiment is contrary to the aforesaid conditions 1 through 3; according to this construction, if the spacing between the light source and the collimator lens does not change, the image plane will shift markedly to the positive side during a temperature rise. To compensate for this shift, the spacing between the light source and the collimator lens must widen. To accomplish this increase in spacing, it is desirable that either the linear expansion coefficient α2 of the support member B is increased to widen the spacing between the collimator lens and the light source during temperature rise or the linear expansion coefficient α1 of the support member A is reduced to narrow the spacing between the collimator lens and the light source. In the present embodiment, values are set such that α1<α2.

The range of the oscillation wavelength of visible laser light used in the present embodiment is assumed to be 460 nm<λ<650 nm. Outside of this range it is difficult to achieve a construction wherein α1 does not exceed α2 on the long wavelength side, the dispersion rate of the glass becomes excessive on the short wavelength side, and the combination of the first lens material and the support members will not satisfy the condition of equation (12). Such as construction is assumed in the second embodiment described below.

Second Embodiment

Figure 3:
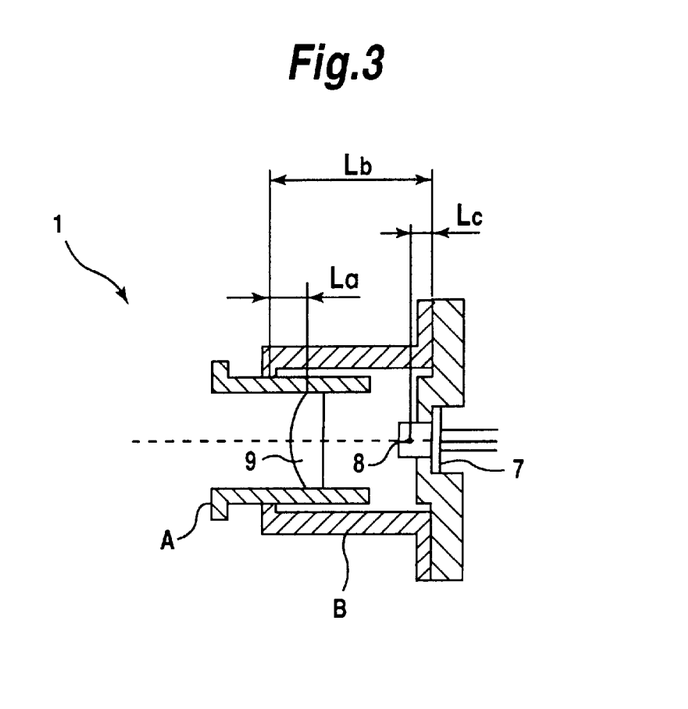
FIG. 3 is a vertical section view of the light source relating to examples 2 and 5 of the second embodiment of the invention.
Figure 4:
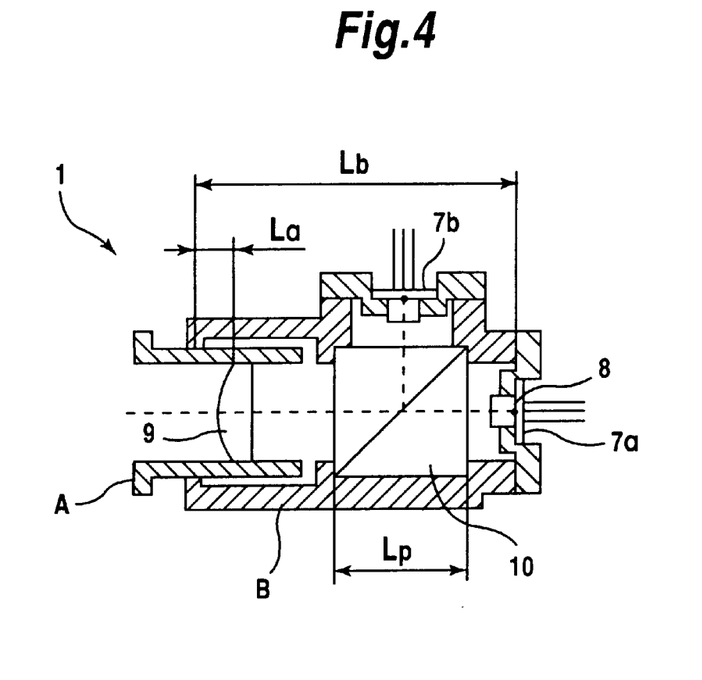
FIG. 4 is a vertical section view of the light source relating to examples 3 and 6 of the second embodiment of the invention.

FIG. 2 is a vertical section view of a light source unit of examples 1 and 4 of the second embodiment described later, as well as the first embodiment. FIG. 3 is a vertical section view of a light source unit of the second and fifth examples described later, wherein the fixed position of the support members is set at a distance from the laser emission point. FIG. 4 is a vertical section view of a light source unit of examples 3 and 6 described later, and shows a cube beam deflector used between the light emission point and the collimator lens in an optical system which scans with laser light emitted from two light sources.

The cylindrical lens and deflection surface are also omitted in the second embodiment as in the first embodiment. First, the change in refractivity of the lens caused by temperature change $\Delta t$ is described below. The refractivity of the lens is not only changed directly by the change in temperature, it is also necessary to consider the change in oscillation wavelength of the semiconductor laser of the light source. The next equation calculates this change.

$$n'=n+\{-(n-1)v^{-1}\cdot\Delta\lambda+d\}\cdot\Delta t$$

Where the following definitions obtain.

n: Refractivity of the lens before a temperature change
n': Refractivity of the lens after a temperature change $\Delta t$
$v^{-1}$: Dispersion rate of the lens
$\Delta\lambda$: Laser oscillation wavelength temperature dependence coefficient
d: Lens refractivity temperature dependence coefficient The focal length is changed, and in addition to the change in refractivity, the lens is also influenced by thermal deformation (thermal expansion). This change is calculated by the following equation.

$$fl'=\{(n-1)/(n'-1)+\Delta L\cdot\Delta t\}fl$$

Where the following definitions obtain.
fl: focal length of the lens before being influenced by a temperature change
fl': focal length of the lens after temperature change $\Delta t$
$\Delta L$: linear expansion coefficient of the lens.

As a result, when the temperature change $\Delta t$ is positive, i.e., when the temperature rises, the focal lengths of the collimator lens and the fθ lens (second lens unit) together are lengthened, and if there is no change in the spacing of the laser emission point and the collimator lens, the image forming point on the scanned medium is shifted to the positive side.

Then, the amount of change is calculated for the spacing between the laser emission point and the collimator lens necessary to compensate for the shift of the image forming point. The amount of this change in spacing is calculated for the distance L1 of the collimator lens and the distance L2 for the fθ lens. When constructing the temperature compensation system, an amount of change equal to the sum of these two values must be provided by the thermal deformation of the light source support members.

First, in order to compensate for the image plane shift caused by the focal length change of the collimator lens, the amount of shift L1 of the laser emission point becomes the following.

$$L1 = flco' - flco$$
$$= \{vco^{-1}\cdot\Delta\lambda - dco/(nco-1) + \Delta Lco\}flco\cdot\Delta t$$

In this equation, the amount of shift of the laser emission point becomes equal to the amount of change in the focal length (of the collimator lens). This relationship is strictly produced when the construction is such that the light flux from the laser emission point is rendered to completely parallel light via the collimator lens, but this relationship is satisfied even in the case of nearly parallel convergent light achieved as far as possible via the construction of the light source unit of the scanning optical apparatus.

The amount L2 of the shift in the laser emission point to compensate for the shift of the image plane caused by the change in focal length of the fθ lens is expressed as follows.

$$L2 = (1/flf - 1/flf')flco^2$$
$$= (flf' - flf)flco2/flf^2$$
$$= \{vf^{-1}\cdot\Delta\lambda - df/(nf-1) + \Delta Lf\}\times flco^2/flf\cdot\Delta t$$

Although this equation also expresses a case similar to the parallel light for L1, this relationship can be ignored due to the lack of influence on the state of the light flux from the collimator lens.

Where the following definitions obtain.
flco: Focal length of the first lens (design value)
flco': Focal length of the first lens (during temperature change)
flf: Focal length of the second lens (design value)
flf': Focal length of the second lens (during temperature change)
vco$^{-1}$: Dispersion rate of the first lens
vf$^{-1}$: Dispersion rate of the second lens
dco: Refractivity temperature dependence coefficient of the first lens
df: Refractivity temperature dependence coefficient of the second lens
ΔLco: Linear expansion coefficient of the first lens
ΔLf: Linear expansion coefficient of the second lens On the other hand, in practice the thermal deformation (thermal expansion) of the light source support members affects the change of spacing between the laser emission point and the collimator lens. Then the amount of this change is designated L3, the following equation obtains.

$$L3 = Fko \cdot \Delta t$$
$$= (Lb \cdot \alpha 2 - La \cdot \alpha 1) \cdot \Delta t$$
or
$$= \{Lb \cdot \alpha 2 - La \cdot \alpha 1 + LC \cdot (\alpha 2 - \alpha 3)\} \cdot \Delta t$$

Where the following definitions obtain.
α: Linear expansion coefficient of the support member
La: Distance in the optical axis from the fixed position of the support member A and the support member B to the first lens
Lb: Distance from the emission point of the light source to the fixed positions of the support member A and the support member B (Lb=flco+La)
α1: Linear expansion coefficient of support member A
α2: Linear expansion coefficient of support member B
LC: Distance on the optical axis from the emission point of the light source to the fixed position of the support member B and the LD laser diode) package
α3: Linear expansion coefficient of the LD package The upper level of the L3 equation calculates the amount of change of α as the composite linear expansion coefficient when the linear expansion coefficient of the support member is formed of one type of material or when a plurality of support members have different linear expansion coefficients. Since the spacing between the emission point and the collimator lens as the collimator lens focal length flco is not a problem, the value of L3 can be calculated by the product of the linear expansion coefficient α, focal length flco, and temperature change Δt. The middle level of the equation specifies two support members, such that the necessary composite linear expansion coefficient can be formed by selecting α1, α2, La. FIG. 2 illustrates this condition.

The bottle level of the equation specifies a case wherein an LD (laser diode) emission unit is inserted as a light source in a package and the fixed positions of this LD package and the support member B maintain a distance (in the optical axis direction) between the LD emission point. Since the material of the LD package is normally set, it cannot be said there is only one variable for establishing the composite linear expansion coefficient α, but this factor must be considered when the focal length of the collimator lens is short.

The relationship L1+L2~L3 must be satisfied to establish the temperature compensation system as described above. That is, this equation can be substituted as follows when ΔX is a tolerance value.

$$|L1+L2-L3| \leq \Delta X$$

The tolerance value ΔX stipulates the performance assurance range of temperature change ±Δt within the apparatus, as well as the tolerance value for the change in beam diameter D/Do on the image plane at this time. When it is stipulated that D/Do≦1.05, the tolerance value of the amount of shift of the image plane can be calculated.

Where the following definitions obtain.
Do: beam diameter on the image plane before the influence of temperature change
D: beam diameter on the image plane after temperature change Δt When the amount of allowed shift of the image plane (focal depth) is designated dXf and the laser oscillation wavelength is designated λ, the following obtains.

$$dXf = \pi Do^2 / 4\lambda \cdot \{(D/Do)^2 - 1\}^{1/2}$$

Since the value ΔX is the depth on the light source side, from the relationship ΔX=flco²/flf²·dXf the following expression is obtained.

$$\Delta X = flco^2 / flf^2 \cdot \pi Do^2 / 4\lambda \cdot \{(D/Do)^2 - 1\}^{1/2}$$
$$\approx 0.25 \cdot flco^2 / flf^2 \cdot Do^2 / \lambda$$

From this equation suitable tolerance values can be obtained which correspond to the oscillation wavelength, beam diameter, and focal length of the lens.

Since the values L1, L2, and L3 include the item flco·Δt, the following substitutions can be made:

$$L1 = L1' \cdot flco \cdot |\Delta t|$$
$$L2 = L2' \cdot flco \cdot |\Delta t|$$
$$L3 = L3' \cdot flco \cdot |\Delta t| = \alpha \cdot flco \cdot |\Delta t|$$
$$\Delta X = \Delta X' \cdot flco \cdot |\Delta t|$$

and the condition |L1+L2−L3|≦ΔX can be substituted in the following equation.

$$\alpha - L2' - \Delta X' \leq L1' \leq \alpha - L2' + \Delta X$$

and $$\{\alpha - L2' + dco/(nco-1) - \Delta Lco\} - \Delta X'$$
$$\leq vco^{-1} \cdot \Delta \lambda \leq \{\alpha - L2' + dco/(nco-1) - \Delta Lco\} + \Delta X' \quad \text{Condition (1)}$$

Material having the dispersion rate vco$^{-1}$ satisfying the above condition (1) can be used for the collimator lens.

A two laser diode (LD) scanning system having to light sources 7a and 7b and using a cube beam deflector 10 between the light emission point and the collimator lens, as shown in FIG. 4, is described below. The refractivity of the beam deflector is changed by the temperature change Δt just as in other lenses, and size of the prism changes due to thermal expansion. The amount of change in the length of the optical path resulting from these changes is designated L4 and expressed as shown below.

$$L4 = Lp\{(\Delta Lp \cdot \Delta t + 1)/np' - 1/np - \Delta Lp \cdot \Delta t\}$$

From which is derived the following expression.

$$np' = np + \{(np-1) \cdot vp^{-1} \cdot \Delta \lambda + dp\} \cdot \Delta t$$

Lp: Length of a side of the cube beam deflector ΔLp, np, np', vp$^{-1}$, dp: various quantities Accordingly, in a construction placing a cube beam deflector between the light emission point and the collimator lens, the condition for producing the temperature compensation system becomes the following.

$$|L1+L2-L3-L4| \leq \Delta X$$

By substituting $L4=L4' \cdot flco \cdot |\Delta t|$, the following condition (2) is obtained.

$$\alpha + L4' - L2' - \Delta X' \leq L1' \leq \alpha + L4' - L2' + \Delta X'$$

and $$\{\alpha + L4' - L2' + dco/(nco-1) - \Delta Lco\} - \Delta X'$$
$$\leq vco^{-1} \cdot \Delta \lambda \leq \{\alpha + L4' - L2' + dco/(nco-1) - \Delta Lco\} + \Delta X' \quad \text{Condition (2)}$$

When a cube beam deflector is disposed between the light emission point and the collimator lens, a material having a dispersion rate $vco^{-1}$ may be used for the collimator lens (first lens) to satisfy the aforesaid condition (2). The condition (2) need not be satisfied when the beam deflector is a thin plate-glass half mirror, or when a cube beam deflector is disposed between the deflecting device and the collimator lens since the influence of temperature fluctuation can be ignored, and only condition (1) need be satisfied for situations not using a cube beam deflector. Various examples are given below.

EXAMPLES 1 THROUGH 3

TABLE 4

Laser (light source) data

| | |
|---|---|
| Oscillation wavelength (nm) | 635 |
| Oscillation wavelength temperature dependence coefficient | 0.23 |

TABLE 5

Material quantities

| | N | $v^{-1}(\times 10^{-5})$ | $d(\times 10^{-5})$ | $\Delta L(\times 10^{-5})$ | $L'(\times 10^{-5})$ |
|---|---|---|---|---|---|
| PC | 1.58002 | 12.37 | −11 | 6.90 | 28.71 |
| AC | 1.48956 | 7.10 | −10.7 | 6.90 | 30.39 |
| ZEONEX | 1.52305 | 7.48 | −8.4 | 6.90 | 24.68 |
| BK7 | 1.51501 | 6.33 | 0.26 | 0.78 | 1.73 |
| SK5 | 1.58701 | 7.04 | 0.33 | 0.56 | 1.62 |
| LAK31 | 1.69408 | 7.20 | 0.38 | 0.65 | 1.76 |
| SF6 | 1.79857 | 15.24 | 0.95 | 0.84 | 3.16 |
| SF55 | 1.69564 | 12.81 | 0.46 | 0.85 | 3.14 |
| SF57 | 1.83926 | 16.06 | 0.95 | 0.79 | 3.35 |
| LaSF51 | 1.79726 | 8.73 | 0.38 | 0.63 | 2.16 |
| FKS53 | 1.49180 | 4.86 | −0.56 | 1.31 | 3.57 |

$L' = v^{-1} \cdot \Delta \lambda - d/(n-1)\Delta L$ $$L' = v^{-1} \cdot \Delta \lambda - d/(n-1)\Delta L$$

EXAMPLE 1

| | |
|---|---|
| $\Delta t = \pm 30$ degrees | $Do = 70 \, \mu m$ |
| $flco = 10$ mm | 1LD, LC = 0 |
| $flf = 350$ mm | $f\theta$ material: ZEONEX |
| $La = 3.3$ mm | $\alpha 1 = 1.17 \times 10^{-5}$ (Fe) |
| $Lb = 13.3$ mm | $\alpha 2 = 3.20 \times 10^{-5}$ (PC-GF 30%) |
| $\alpha$ | $= \{Lb \cdot \alpha 2 - La \cdot \alpha 1\}/flco =$ |
| | $3.87 \times 10^{-5}$ |

-continued

| | |
|---|---|
| L2' | $= L_{ZEONEX}' \cdot flco/flf =$ |
| | $7.05 \times 10^{-6}$ |
| $\therefore \alpha - L2' = 3.16 \times 10^{-5}$ | |
| $\Delta X'$ | $= 0.25 flco \cdot Do^2/\lambda/|\Delta t|/flf^2 =$ |
| | $5.25 \times 10^{-6}$ |
| $\therefore \alpha - L2' - \Delta X' \leq L1' \leq \alpha - L2' + \Delta X'$ | |
| $2.64 \times 10^{-5} \leq L1' \leq 3.69 \times 10^{-5}$ | |

Since L1'=L', the temperature compensation system can be achieved if suitable material is selected for the collimator lens from the table above. In this example, suitable materials are SF6 and SF55. The shift tolerance (focal depth) dXf of the image plane at this time is $$dXf = \pm 0.25 \cdot Do^2/\lambda$$
$$= \pm 1.9 \text{ mm}$$

whereas, the amount of shift $\Delta Xf$ of the image plane by $\Delta t$ when SF6 is selected is $$\Delta Xf = |(\alpha - L2' - L_{SF6'}) \cdot flco \cdot \Delta t| flf^2 / flco^2$$
$$= 0.03 \text{ mm}$$

EXAMPLE 2

| | |
|---|---|
| $\Delta t = \pm 30$ degrees | $Do = 70 \, \mu m$ |
| $flco = 7$ mm | 1LD |
| $flf = 250$ mm | $f\theta$ material: ZEONEX |
| $La = 3$ mm | $\alpha 1 = 2.30 \times 10^{-5}$ (Fe) |
| $Lb = 10$ mm | $\alpha 2 = 3.20 \times 10^{-5}$ (PC-GF 30%) |
| $LC = 2.5$ mm | $\alpha 3 = 1.70 \times 10^{-5}$ (Cu) |
| $\alpha$ | $= \{Lb \cdot \alpha 2 - La \cdot \alpha 1 + LC \cdot (\alpha 2 - \alpha 3)\}/flco =$ |
| | $4.12 \times 10^{-5}$ |
| L2' | $= L_{ZEONEX}' \cdot flco/flf =$ |
| | $6.91 \times 10^{-6}$ |
| $\therefore \alpha - L2' = 3.43 \times 10^{-5}$ | |
| $\Delta X'$ | $= 0.25 flco \cdot Do^2/\lambda/|\Delta t|/flf^2 =$ |
| | $7.20 \times 10^{-6}$ |
| $\therefore \alpha - L2' - \Delta X' \leq L1' \leq \alpha - L2' + \Delta X'$ | |
| $2.71 \times 10^{-5} \leq L1' \leq 4.15 \times 10^{-5}$ | |

Since L1'=L', the temperature compensation system can be achieved if suitable material is selected for the collimator lens from the table above. In this example, suitable materials are SF57 and FKS53. The shift tolerance (focal depth) dXf of the image plane at this time is $$dXf = \pm 0.25 \cdot Do^2/\lambda$$
$$= \pm 1.9 \text{ mm}$$

whereas, the amount of shift $\Delta Xf$ of the image plane by $\Delta t$ when SF6 is selected is $$\Delta Xf = |(\alpha - L2' - L_{SF6'}) \cdot flco \cdot \Delta t| flf^2 / flco^2$$
$$= 0.21 \text{ mm}$$

EXAMPLE 3

| | |
|---|---|
| $\Delta t = \pm 30$ degrees | $Do = 65\ \mu m$ |
| $flco = 9$ mm | 2LD, LC = 0 |
| $flf = 300$ mm | f$\theta$ material: SF57 |
| $La = 3$ mm | $\alpha 1 = 1.17 \times 10^{-5}$ (Fe) |
| $Lb = 12$ mm | $\alpha 2 = 1.64 \times 10^{-5}$ (stainless) |
| $Lp = 5$ mm | Cube beam deflector material: SF57 |
| $\alpha = (Lb \cdot \alpha 2 - La \cdot \alpha 1)/flco =$ | |
| $1.80 \times 10^{-5}$ | |
| $L2' = L_{SF57}' \cdot flco/flf =$ | |
| $1.01 \times 10^{-6}$ | |
| $np' = np + \{-(np-1) \cdot vp^{-1} \cdot \Delta\lambda + dp\} \cdot \Delta t =$ | |
| $1.83862$ | |
| $L4' = Lp\{(\Delta Lp \cdot \Delta t + 1)/np' - 1/np - \Delta Lp \cdot \Delta t\}/flco/\Delta t =$ | |
| $1.53 \times 10^{-6}$ | |
| $\therefore \alpha + L4' - L2' = 1.85 \times 10^{-5}$ | |
| $\Delta X' = 0.25 flco \cdot Do^2/\lambda/|\Delta t|/flf^2 =$ | |
| $5.54 \times 10^{-6}$ | |
| $\therefore \alpha - L2' - \Delta X' \leq L1' \leq \alpha - L2' + \Delta X'$ | |
| $1.29 \times 10^{-5} \leq L1' \leq 2.40 \times 10^{-5}$ | |

Since L1'=L', the temperature compensation system can be achieved if suitable material is selected for the collimator lens from the table above. In this example, suitable materials are LAK31 and BK7. The shift tolerance (focal depth) dXf of the image plane at this time is $$dXf = \pm 0.25 \cdot Do^2 / \lambda$$
$$= \pm 1.7\ mm$$

whereas, the amount of shift $\Delta Xf$ of the image plane by $\Delta t$ when LAK31 is selected is $$\Delta Xf = |(\alpha - L2' - L_{LAK31'}) \cdot flco \cdot \Delta t| flf^2 / flco^2$$
$$= 0.27\ mm$$

EXAMPLES 4 THROUGH 6

TABLE 6

| Laser (light source) data | |
|---|---|
| Oscillation wavelength (nm) | 470 |
| Oscillation wavelength temperature dependence coefficient ($\Delta\lambda$)[nm/deg] | 0.23 |

TABLE 7

| | | Material quantities | | | |
|---|---|---|---|---|---|
| | N | $v^{-1}(\times 10^{-5})$ | $d(\times 10^{-5})$ | $\Delta L(\times 10^{-5})$ | $L'(\times 10^{-5})$ |
| PC | 1.58002 | 12.37 | -11 | 6.90 | 28.71 |
| AC | 1.48956 | 7.10 | -10.7 | 6.90 | 30.39 |
| ZEONEX | 1.52305 | 7.48 | -8.4 | 6.90 | 24.68 |
| BK7 | 1.51501 | 6.33 | 0.26 | 0.78 | 1.73 |
| SK5 | 1.58701 | 7.04 | 0.33 | 0.56 | 1.62 |
| LAK31 | 1.69408 | 7.20 | 0.38 | 0.65 | 1.76 |
| SF6 | 1.79857 | 15.24 | 0.95 | 0.84 | 3.16 |
| SF55 | 1.69564 | 12.81 | 0.46 | 0.85 | 3.14 |
| SF57 | 1.83926 | 16.06 | 0.95 | 0.79 | 3.35 |
| LaSF51 | 1.79726 | 8.73 | 0.38 | 0.63 | 2.16 |
| FKS53 | 1.49180 | 4.86 | -0.56 | 1.31 | 3.57 |

EXAMPLE 4

| | |
|---|---|
| $\Delta t = \pm 30$ degrees | $Do = 50\ \mu m$ |
| $flco = 9$ mm | 1LD, LC = 0 |
| $flf = 320$ mm | f$\theta$ material: ZEONEX |
| $La = 5$ mm | $\alpha 1 = 1.17 \times 10^{-5}$ (Fe) |
| $Lb = 14$ mm | $\alpha 2 = 3.20 \times 10^{-5}$ (PC-GF 30%) |
| $\alpha = (Lb \cdot \alpha 2 - La \cdot \alpha 1)/flco =$ | |
| $4.33 \times 10^{-5}$ | |
| $L2' = L_{ZEONEX}' \cdot flco/flf =$ | |
| $7.51 \times 10^{-6}$ | |
| $\therefore \alpha - L2' = 3.58 \times 10^{-5}$ | |
| $\Delta X' = 0.25 flco \cdot Do^2/\lambda/|\Delta t|/flf^2 =$ | |
| $3.90 \times 10^{-6}$ | |
| $\therefore \alpha - L2' - \Delta X' \leq L1' \leq \alpha - L2' + \Delta X'$ | |
| $3.19 \times 10^{-5} \leq L1' \leq 3.97 \times 10^{-5}$ | |

Since L1'=L', the temperature compensation system can be achieved if suitable material is selected for the collimator lens from the table above. In this example, suitable materials are SK5 and BK7. The shift tolerance (focal depth) dXf of the image plane at this time is $$dXf = \pm 0.25 Do^2 / \lambda$$
$$= \pm 1.3\ mm$$

whereas, the amount of shift $\Delta Xf$ of the image plane by $\Delta t$ when SK5 is selected is $$\Delta Xf = |(\alpha - L2' - L_{SK5'}) \cdot flco \cdot \Delta t| flf^2 / flco^2$$
$$= 0.17\ mm$$

EXAMPLE 5

| | |
|---|---|
| $\Delta t = \pm 30$ degrees | $Do = 35\ \mu m$ |
| $flco = 15$ mm | 1LD |
| $flf = 350$ mm | f$\theta$ material: SF57 |
| $La = 4.5$ mm | $\alpha 1 = 1.17 \times 10^{-5}$ (Fe) |
| $Lb = 19.5$ mm | $\alpha 2 = 3.20 \times 10^{-5}$ (PC-GF 30%) |
| $LC = 2.5$ mm | $\alpha 3 = 1.70 \times 10^{-5}$ (Cu) |
| $\alpha = \{Lb \cdot \alpha 2 - La \cdot \alpha 1 + LC \cdot (\alpha 2 - \alpha 3)\}/flco =$ | |
| $4.06 \times 10^{-5}$ | |
| $L2' = L_{SF57}' \cdot flco/flf =$ | |
| $4.25 \times 10^{-6}$ | |
| $\therefore \alpha - L2' = 3.63 \times 10^{-5}$ | |
| $\Delta X' = 0.25 flco \cdot Do^2/\lambda/|\Delta t|/flf^2 =$ | |
| $2.66 \times 10^{-6}$ | |
| $\therefore \alpha - L2' - \Delta X' \leq L1' \leq \alpha - L2' + \Delta X'$ | |
| $3.37 \times 10^{-5} \leq L1' \leq 3.90 \times 10^{-5}$ | |

Since L1'=L', the temperature compensation system can be achieved if suitable material is selected for the collimator lens from the table above. In this example, suitable materials are SK5 and BK7. The shift tolerance (focal depth) dXf of the image plane at this time is $$dXf = \pm 0.25 Do^2 / \lambda$$
$$= \pm 0.7\ mm$$

whereas, the amount of shift $\Delta Xf$ of the image plane by $\Delta t$ when SF6 is selected is $$\Delta Xf = |(\alpha - L2' - L_{SK57'}) \cdot flco \cdot \Delta t| flf^2 / flco^2$$
$$= 0.016 \text{ mm}$$

EXAMPLE 6

| | |
|---|---|
| $\Delta t = \pm 30$ degrees | $Do = 40 \mu m$ |
| flco = 9 mm | 2LD, LC = 0 |
| flf = 300 mm | f$\theta$ material: ZEONEX |
| La = 3 mm | $\alpha 1 = 2.30 \times 10^{-5}$ (Al) |
| Lb = 12 mm | $\alpha 2 = 3.20 \times 10^{-5}$ (PC-GF 30%) |
| Lp = 5 mm | Cube beam deflector material: SF57 |
| $\alpha$ | = (Lb · $\alpha$2 − La · $\alpha$1)/flco |
| | = 3.50 × 10$^{-5}$ |
| L2' | = Lzeonex' · flco/flf |
| | = 8.01 × 10$^{-6}$ |
| np' | = np + {−(np − 1) · v$^{-1}$ · $\Delta\lambda$ + dp} · $\Delta$t |
| | = 1.87566 |
| L4' | = Lp{($\Delta$Lp · $\Delta$t + 1)/np' − 1/np · $\Delta$Lp · $\Delta$t}/flco/$\Delta$t |
| | = 1.06 × 10$^{-6}$ |
| ∴ $\alpha$ + L4' − L2' = 1.85 × 10$^{-5}$ | |
| $\Delta$X' | = 0.25 flco · Do$^2$/$\lambda$/$|\Delta$t$|$/flf$^2$ |
| | = 2.84 × 10$^{-6}$ |
| ∴ $\alpha$ − L2' − $\Delta$X' ≤ L1' ≤ $\alpha$ − L2' + $\Delta$X' | |
| 3.47 × 10$^{-5}$ ≤ L1' ≤ 4.04 × 10$^{-5}$ | |

Since L1'=L', the temperature compensation system can be achieved if suitable material is selected for the collimator lens from the table above. In this example, suitable materials are BK7 and SK5. The shift tolerance (focal depth) dXf of the image plane at this time is $$dXf = \pm 0.25 Do^2 / \lambda$$
$$= \pm 0.9 \text{ mm}$$

whereas, the amount of shift $\Delta Xf$ of the image plane by $\Delta t$ when LAK31 is selected is $$\Delta Xf = |(\alpha - L2' - L_{LAK31'}) \cdot flco \cdot \Delta t| flf^2 / flco^2$$
$$= 0.12 \text{ mm}$$

The present invention as described above provides a scanning optical apparatus having a light source unit capable of compensating for the shift of the image forming point on a scanned medium caused by temperature fluctuation by using a single lens or a plurality of lenses which do not include a negative power lens as a condensing lens even in the visible light range which is subject to large refractivity change depending on the wavelength, and further provides a scanning optical apparatus which accomplishes temperature compensation for the entire optical system including temperature fluctuation of the f$\theta$ lens system via a simple construction without using an expensive autofocus mechanism for detection and feedback of the image forming position.

In the constructions of the previously described examples in particular, it is possible to compensate for the shift of the image forming point on a scanned medium caused by temperature fluctuation via a construction of simple light source support members even when using a visible light laser as a light source and without eliminating color from the light source unit (first lens unit). In this way, the support structure of the light source unit is simplified and rendered more compact and allows a breadth of material selection for the support members, thereby reducing the cost of the light source unit.

According to the constructions of the various examples given above, it is possible to compensate for the shift in the image forming point on a scanned medium caused by temperature fluctuation via a construction of simple support members and the selection of the materials of said support members while using a single lens for the light source unit (first lens unit) even when using a visible light laser which has a large refractivity variation caused by wavelength variation and further allows the use of a small diameter beam when using a visible light laser.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A scanning optical apparatus comprising:
   a light source which emits a ray;
   a first lens unit for forming a luminous flux using the ray and having at least one or more positive lens elements;
   a scanner for scanning the luminous flux;
   a second lens unit for forming an image on a scanned medium using the luminous flux and having a lens element; and
   a holding structure connecting the light source to the first lens unit via at least two support members having mutually different linear expansion coefficients,
   wherein the movement of the image forming point on the scanned medium caused by at least one of thermal deformation of lenses included in the first or second lens units, and thermal refractivity fluctuation of the first or second lens units is compensated by the thermal expansion of the support members, wherein the scanning optical apparatus fulfills the following condition:
   $\alpha 1 < \alpha 2$
   $\alpha 1$: Linear expansion coefficient of the support member A supporting the first lens unit, and
   $\alpha 2$: Linear expansion coefficient of the support member B supporting the light source and the support member A.

2. A scanning optical apparatus as claimed in claim 1, wherein the scanning optical apparatus fulfills the following condition:

$$|L1+L2-L3| < 0.0001 \cdot \Delta t$$

where the parameters are defined by the following definitions:
nco'=nco+{−(nco−1)vco$^{-1}$·$\Delta\lambda$+dco}·$\Delta$t
nf'=nf+{−(nf−1)vf$^{-1}$·$\Delta\lambda$+df}·$\Delta$t
flf'={(nf−1)/(nf'−1)+$\Delta$Lf·$\Delta$t}flf
L1={(nco−1)/(nco'−1)+$\Delta$Lco·$\Delta$t−1}flco
L2=(1/flf−1/flf')flco$^2$
L3=(Lb·$\alpha$2−La·$\alpha$1)·$\Delta$t
where,
   $\Delta$t: Temperature change (° C.)
   $\Delta\lambda$: Oscillation wavelength temperature dependence coefficient (nm·deg$^{-1}$)
   nco: Design value of refractivity of the first lens
   nco': Refractivity of the first lens during temperature change nf: Design value of refractivity of the second lens nf': Refractivity of the second lens during temperature change flco: Design value of focal length of the first lens (mm)

flco': Focal length of the first lens during temperature change (mm)

flf: Design value of focal length of the second lens (mm)

flf': Focal length of the second lens during temperature change (mm)

$vco^{-1}$: Dispersion rate of the first lens $(nm^{-1})$ $vf^{-1}$: Dispersion rate of the second lens $(nm^{-1})$ dco: Refractivity temperature dependence coefficient of the first lens $(deg^{-1})$ df: Refractivity temperature dependence coefficient of the second lens $(deg^{-1})$ ΔLco: Linear expansion coefficient of the first lens $(deg^{-1})$ ΔLf: Linear expansion coefficient of the second lens $(deg^{-1})$ La: Distance on the optical axis from the fixed position of the support member A and support B to the first lens (mm)

Lb: Distance on the optical axis from the light emission point of the light source to the fixed position of the support member A and the support member B (mm).

3. A scanning optical apparatus as claimed in claim 1, wherein the scanning optical apparatus fulfills the following condition:

$$\{\alpha - L2' + dco/(nco-1) - \Delta Lco\} - \Delta X' \leq vco^{-1} \cdot \Delta\lambda \leq \{\alpha - L2' + dco/(nco-1) - \Delta Lco\} + \Delta X'$$

where the parameters are defined by the following definitions:

$$\alpha = \sum_{i=1}^{N} li \cdot \alpha i / flco$$

$L2' = \{vf^{-1} \cdot \Delta\lambda - df/(nf-1) + \Delta Lf\} \cdot flco/flf$ $\Delta X' = 0.25 \cdot Do^2 \cdot flco/(|\Delta t| \cdot \lambda \cdot flf^2)$ $\Delta t = \pm 30$ deg.

where, nco: Design value of refractivity of the first lens dco: Refractivity temperature dependence coefficient of the first lens $(deg^{-1})$ ΔLco: Linear expansion coefficient of the first lens $(deg^{-1})$ α: Combination linear expansion coefficient of the support members $(deg^{-1})$ li: length of i-th supporting member in a direction of an optical axis of the first lens (mm)

αi: Linear expansion coefficient of the i-th supporting member $(deg^{-1})$ flco: Design value of focal length of the first lens (mm)

flf: Design value of focal length of the second lens (mm)

nf: Design value of refractivity of the second lens $vf^{-1}$: Dispersion rate of the second lens $(nm^{-1})$ df: Refractivity temperature dependence coefficient of the second lens $(deg^{-1})$ ΔLf: Linear expansion coefficient of the second lens $(deg^{-1})$ Do: Diameter of the luminous flux (mm)

λ: Laser oscillation wavelength (mm)

Δλ: Oscillation wavelength temperature dependence coefficient $(nm \cdot deg^{-1})$ N: Number of support members i: Summation variable Δt: Fluctuation range of a temperature.

4. A scanning optical apparatus comprising:

two light sources which emit rays;

a cube beam deflector for deflecting the rays in the same direction;

a first lens unit for forming luminous fluxes using the rays and having at least one or more positive lens elements;

a scanner for scanning the luminous fluxes;

a second lens unit for forming images on a scanned medium using the luminous fluxes and having a lens element; and a holding structure connecting the light sources to the first lens unit via at least two support members having mutually different linear expansion coefficients, wherein the movement of the image forming point on the scanned medium caused by at least one of thermal deformation of lenses included in the first or second lens units, and thermal refractivity fluctuation of the first or second lens units is compensated by the thermal expansion of the support members, wherein the scanning optical apparatus fulfills the following condition:

α1<α2

α1: Linear expansion coefficient of the support member A supporting the first lens unit, and α2: Linear expansion coefficient of the support member B supporting the light source and the support member A.

5. A scanning optical apparatus as claimed in claim 4, wherein the scanning optical apparatus fulfills the following condition:

$$|L1+L2-L3|<0.0001 \cdot \Delta t$$

where the parameters are defined by the following definitions:

$nco' = nco + \{-(nco-1)vco^{-1} \cdot \Delta\lambda + dco\} \cdot \Delta t$ $nf' = nf + \{-(nf-1)vf^{-1} \cdot \Delta\lambda + df\} \cdot \Delta t$ $flf' = \{(nf-1)/(nf'-1) + \Delta Lf \cdot \Delta t\} flf$ $L1 = \{(nco-1)/(nco'-1) + \Delta Lco \cdot \Delta t - 1\} flco$ $L2 = (1/flf - 1/flf') flco^2$ $L3 = (Lb \cdot \alpha 2 - La \cdot \alpha 1) \cdot \Delta t$ where, Δt: Temperature change (° C.)

Δλ: Oscillation wavelength temperature dependence coefficient $(nm \cdot deg^{-1})$ nco: Design value of refractivity of the first lens nco': Refractivity of the first lens during temperature change nf: Design value of refractivity of the second lens nf': Refractivity of the second lens during temperature change flco: Design value of focal length of the first lens (mm)

flco': Focal length of the first lens during temperature change (mm)

flf: Design value of focal length of the second lens (mm)

flf': Focal length of the second lens during temperature change (mm)

$vco^{-1}$: Dispersion rate of the first lens $(nm^{-1})$ $vf^{-1}$: Dispersion rate of the second lens ($nm^{-1}$)

dco: Refractivity temperature dependence coefficient of the first lens ($deg^{-1}$)

df: Refractivity temperature dependence coefficient of the second lens ($deg^{-1}$)

ΔLco: Linear expansion coefficient of the first lens ($deg^{-1}$)

ΔLf: Linear expansion coefficient of the second lens ($deg^{-1}$)

La: Distance on the optical axis from the fixed position of the support member A and support B to the first lens (mm)

Lb: Distance on the optical axis from the light emission point of the light source to the fixed position of the support member A and the support member B (mm).

6. A scanning optical apparatus as claimed in claim 4, wherein the scanning optical apparatus fulfills the following condition:

$$\{\alpha+L4'-L2'+dco/(nco-1)-\Delta Lco\}-\Delta X' \leq vco^{-1}\cdot\Delta\lambda \leq \{\alpha+L4'-L2'+dco/(nco-1)-\Delta Lco\}+\Delta X'$$

where the parameters are defined by the following definitions:

$$\alpha = \sum_{i=1}^{N} li \cdot \alpha i / flco$$

$L2'=\{vf^{-1}\cdot\Delta\lambda-df/(nf-1)+\Delta Lf\}\cdot flco/flf$ $\Delta X'=0.25\cdot Do^2\cdot flco/(|\Delta t|\cdot\lambda\cdot flf^2)$ $L4'=Lp\{(\Delta Lp\cdot|\Delta t|+1)/np'-1/np-\Delta Lp\cdot|\Delta t|\}/flco/|\Delta t|$ $np'=np+\{(np-1)\cdot vp^{-1}\cdot\Delta\lambda+dp\}\cdot\Delta t$ $\Delta t=\pm 30$ deg.

where, nco: Design value of refractivity of the first lens dco: Refractivity temperature dependence coefficient of the first lens ($deg^{-1}$)

ΔLco: Linear expansion coefficient of the first lens ($deg^{-1}$)

α: Combination linear expansion coefficient of the support members ($deg^{-1}$)

li: length of i-th supporting member in a direction of an optical axis of the first lens (mm)

αi: Linear expansion coefficient of the i-th supporting member ($deg^{-1}$)

flco: Design value of focal length of the first lens (mm)

flf: Design value of focal length of the second lens (mm)

nf: Design value of refractivity of the second lens (mm)

$vf^{-1}$: Dispersion rate of the second lens ($nm^{-1}$)

df: Refractivity temperature dependence coefficient of the second lens ($deg^{-1}$)

ΔLf: Linear expansion coefficient of the second lens ($deg^{-1}$)

Do: Diameter of the luminous flux (mm)

Δt: Fluctuation range of a temperature (deg)

Lp: Length of the cube beam deflector (mm)

np: Design value of refractivity of the cube beam deflector dp: Refractivity temperature dependence coefficient of the cube beam deflector ($deg^{-1}$)

ΔLf: Linear expansion coefficient of the cube beam deflector ($deg^{-1}$)

$vp^{-1}$: Dispersion rate of the cube beam deflector ($nm^{-1}$)

λ: Laser oscillation wavelength (mm)

Δλ: Oscillation wavelength temperature dependence coefficient ($nm\cdot deg^{-1}$)

N: Number of support members i: Summation variable

ΔLp: Linear expansion coefficient of the cube beam deflector ($deg^{-1}$).

7. The scanning optical apparatus of claim 1, wherein the light source emits a ray in a wavelength range of 460 to 650 nm.

8. The scanning optical apparatus of claim 4, wherein the light sources emit rays in a wavelength range of 460 to 650 nm.

* * * * *